T. Vreeland,
Seed Sower.
No. 111,992. Patented Feb. 21, 1871.
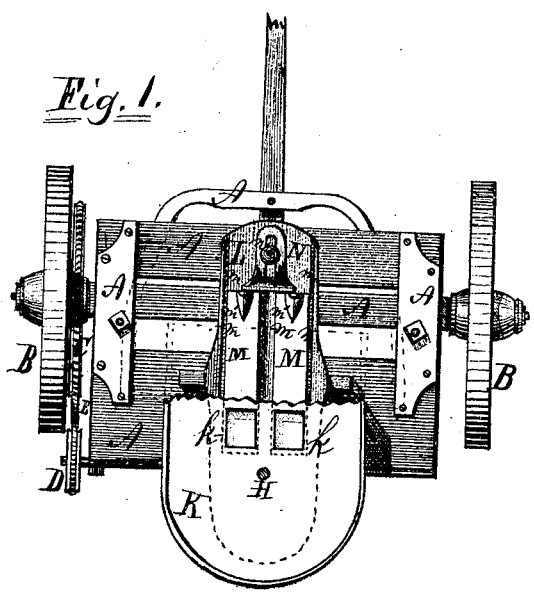
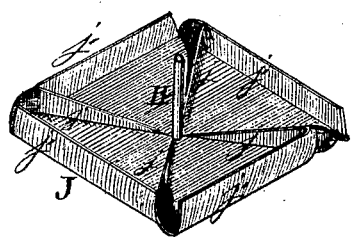
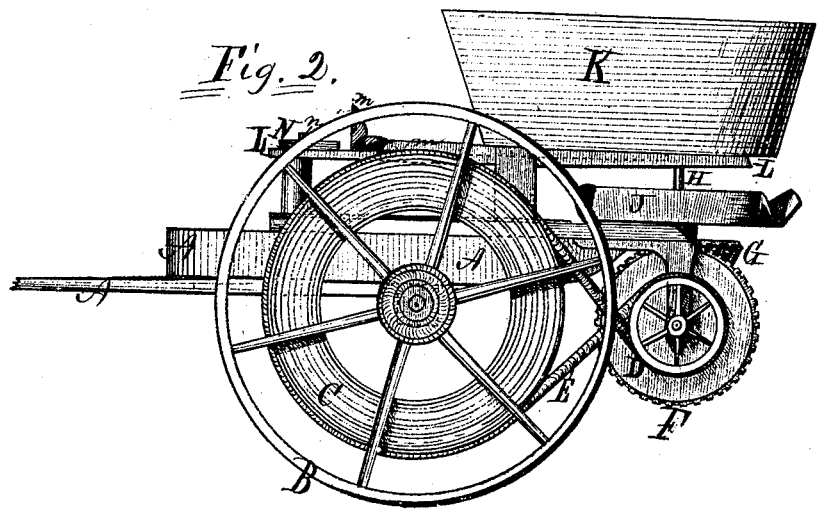
Witnesses:
J. B. Harsh.
Platt R. Richards
Inventor,
Tunis Vreeland,
for W. P. S. Richards, Atty.

UNITED STATES PATENT OFFICE.

TEUNIS VREELAND, OF ONEIDA, ILLINOIS.

IMPROVEMENT IN SEEDERS.

Specification forming part of Letters Patent No. 111,992, dated February 21, 1871; antedated February 11, 1871.

I, TEUNIS VREELAND, of Oneida, in the county of Knox and State of Illinois, have invented certain Improvements in Seeders, of which the following is a specification:

Nature and Objects of the Invention.

The nature of my invention relates to that class of seeders known as "broadcast," in which the seed is distributed by the centrifugal force of a rotating distributer; and the invention consists in the construction of the distributer, being square, and provided with radial and edge flanges to aid in the proper retention and distribution of the seed, all as hereinafter fully described.

Description of the Accompanying Drawing.

Figure 1 is a top plan or view of a machine embodying my invention. Fig. 2 is a side elevation. Fig. 3 is a perspective view of the distributer.

A represents the frame, supported on the wheels B B. C is a pulley on one of the wheels B. D is a pulley, receiving motion from wheel B by cord E. F is a drive-wheel, attached to the shaft of the pulley D. G is a pinion gearing with drive-wheel F, and attached to and rotating the shaft H, which operates the distributer J. K is the hopper, mounted on an elevated frame, L, and pierced in the bottom with holes $k$ $k$, immediately over the distributer J. M M are slides, running between the ways $m$ $m$ $m$, and provided with tongues $m'$ $m'$, for convenience in moving them. N is a guide, slotted as shown, through which a thumb-screw, $n$, passes into the frame-piece L.

By means of thumb-screw $n$ the position of the guide N, longitudinally, may be regulated, and thereby the position of the slides M, the ends of which pass under the hopper K and holes $k$ $k$, and govern the flow of seed through the same.

The frames A and L may be mounted on the rear end of an ordinary wagon-bed, if desired, and by attaching the pulley C on one of the wheels the machine is ready for operation.

Radial flanges $j$ $j$ $j$ $j$ are attached to the upper face of the distributer J, running from the center to the corners of said distributer, and the edges $j'$ $j'$ $j'$ $j'$ of the distributer J are turned up to prevent the seed dropping off too suddenly, and to throw the discharge from the spouts formed at the corners of the distributer J. (Shown at Fig. 3.)

Claim.

I claim as my invention—

The distributer J, when provided with radial flanges $j$ $j$ $j$ $j$ and side flanges, $j'$ $j'$ $j'$ $j'$, constructed as shown, so as to form discharge-spouts at the corners, substantially as described, and for the purpose set forth.

TEUNIS VREELAND.

Witnesses:
  M. D. COOKE,
  PLATT R. RICHARDS.